US006639775B1

(12) United States Patent
Musiol et al.

(10) Patent No.: US 6,639,775 B1
(45) Date of Patent: Oct. 28, 2003

(54) ELECTRIC CIRCUIT BREAKER HAVING A DATA STORE

(75) Inventors: Aaron-Ernst Musiol, Berlin (DE); Gerhard Tietz, Berlin (DE); Michael-Alexander Jankowiak, Berlin (DE); Hans Rehaag, Zepernick (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/806,451

(22) PCT Filed: Sep. 30, 1999

(86) PCT No.: PCT/DE99/03240

§ 371 (c)(1), (2), (4) Date: Mar. 30, 2001

(87) PCT Pub. No.: WO00/19474

PCT Pub. Date: Apr. 6, 2000

(30) Foreign Application Priority Data

Sep. 30, 1998 (DE) .......................................... 198 45 799

(51) Int. Cl.[7] ................................................ H02H 3/00

(52) U.S. Cl. ...................................................... 361/93.3

(58) Field of Search ........................ 361/42, 46, 47–50, 361/85, 87, 92, 93.3, 93.5, 93.7, 93.2, 93.1, 94–98; 439/620, 955

(56) References Cited

U.S. PATENT DOCUMENTS

| | | | | |
|---|---|---|---|---|
| 4,958,252 A | * | 9/1990 | Murphy | 361/93.3 |
| 5,495,396 A | * | 2/1996 | Mendick et al. | 361/772 |
| 5,660,567 A | | 8/1997 | Nierlich et al. | 439/620 |

FOREIGN PATENT DOCUMENTS

| | | | |
|---|---|---|---|
| EP | B1493272 | 3/1996 | H01H/71/74 |
| WO | A1-9708725 | 3/1997 | H01H/71/12 |

* cited by examiner

*Primary Examiner*—Ronald W. Leja
(74) *Attorney, Agent, or Firm*—Harness, Dickey & Pierce, P.L.C.

(57) ABSTRACT

An electrical power circuit breaker includes an electric overcurrent trip unit for processing a signal from a current sensor. A flexible connecting line is provided for connecting the current sensor to the overcurrent trip unit and a first component of a two-part plug apparatus is fitted to its end. The second component of this plug apparatus is part of the overcurrent trip unit. At least one resistor is arranged between contact pins in the first component, in order to code individual characteristic values or combinations of such characteristic values, such as the rated current or switching rating class.

10 Claims, 1 Drawing Sheet

ELECTRIC CIRCUIT BREAKER HAVING A DATA STORE

This application is the national phase under 35 U.S.C. §371 of PCT International Application No. PCT/DE99/03240 which has an International filing date of Sep. 30, 1999, which designated the United States of America.

FIELD OF THE INVENTION

The invention relates to an electrical power circuit breaker. More specifically, it relates to an electrical power circuit breaker having the following features:

- an electromechanical assembly having at least one switching contact, a drive apparatus which operates the switching contact and associated latching devices for allowing energy stores to close and open the switching contact,
- a current sensor for detecting a current flowing via the switching contact,
- an electronic overcurrent trip unit for processing a signal from the current sensor and for emitting a signal to allow the latching device to open the switching contact,
- a moving connecting line for connecting the current transformer to the overcurrent trip unit, and
- an information memory for passing characteristic values of the electromechanical assembly in the power circuit breaker to the overcurrent trip unit.

BACKGROUND OF THE INVENTION

A power circuit breaker has been disclosed, for example, in WO 97/08725. In this case, the information memory is located on the outside of the housing of the overcurrent trip unit, and is detachably fitted thereto. Fitting the information memory to the overcurrent trip unit means that, when the overcurrent trip unit is being tested after removing it from the power circuit breaker, the information memory is also included in the test and any faults in it are also detected. This procedure assumes that, when the current transformer in the power circuit breaker is replaced, the information memory also needs to be replaced or its programming needs to be adapted. Similar measures are required with an arrangement according to EP 0493 272 B1, in which an interface card, fixed to the switch, is provided. Further, firstly the current transformer and secondly the overcurrent trip unit must be connected to the interface card.

The two different systems (WO 97/08725 A1 and EP 0 493 272 B1) do not necessarily include the current transformers (and/or current sensors) in the information chain required for correct operation of such a power circuit breaker.

SUMMARY OF THE INVENTION

In contrast to the known systems, the invention is based on the object of improving the reliability against spurious operation of the power circuit breaker, by improving the transfer of parameters to the electronic overcurrent trip unit.

According to the invention, this object is achieved based upon the fact that the information memory is a part of a first component, which is connected on the connecting line of a two-part plug and socket apparatus, whose second component is part of the overcurrent trip unit. The installation of the current transformer in the power circuit breaker or the subsequent replacement of the current transformer in this way defines the rated current of the power circuit breaker. At the same time, this information memory can be used to define further characteristic values, such as the switching rating class or the Standard class of the power circuit breaker. In this case, the term switching rating class refers to the rating of the electromechanical assembly in accordance with a specific required switching capacity, for example, which is stated in kA. The term Standard class in the present context refers to a design in accordance with specific regional regulations, for example. In particular, it refers to those for the IEC market, the ANSI market or the UL market. It should also be mentioned that, in the present context, the term characteristic value refers to a combination of a specific parameter, for example the rated current, with a value of the rated current.

Since, as is known, resistors are among the most reliable and simplest electrical components, it appears to be advantageous to form the information memory by means of resistors, for example. These resistors can expediently be connected between the contact pins of the first component of the plug apparatus. If, for example, four characteristic values need to be coded, (for example the rated current of the power circuit breaker, its physical size, the switching rating class and the Standard class) then one resistor can be provided for each of these for this purpose. The resistance can be between approximately 1Ω and approximately 1 MΩ, for example, with defined steps of the characteristic values being allocated to the resistance values. In this way, 16 different values can be defined, for example, without any error within said range of resistance values.

If only a limited number of characteristic values need to be stored, then, according to a further refinement of the invention, this can be achieved by providing only a single resistor, whose resistance represents a predetermined combination of characteristic values.

A plug connector for connecting a medical sensor to an electronic evaluation appliance and which contains an electronic coding element is already known (U.S. Pat. No. 5,660,567 A1). The coding element simplifies the sensor since this now does not need to contain any calibration device. The field of application of the known plug connector is a two-part arrangement (sensor and evaluation appliance), while the subject matter of the invention explained above is a three-part arrangement, including an electrical power circuit breaker, current transformers for measuring the current flowing via the current path in the electromechanical part of the power circuit breaker, and an electronic overcurrent trip unit for opening switching contents. Furthermore, it was not possible to find any idea leading to the invention explained above from the cited document, since the idea for and result of the known measure are considerably different from the invention. In particular, the known arrangement does not lead to the idea that a plug connector can be equipped with a way for coding all the characteristic values which define the interaction of the power circuit breaker (electromechanical part), current transformer and overcurrent trip unit.

BRIEF DESCRIPTION OF THE DRAWINGS

The invention will be explained in more detail in the following text with reference to the exemplary embodiment illustrated in the figures, wherein.

DETAILED DESCRIPTION OF THE PREFERRED EMBODIMENTS

Figure 1:
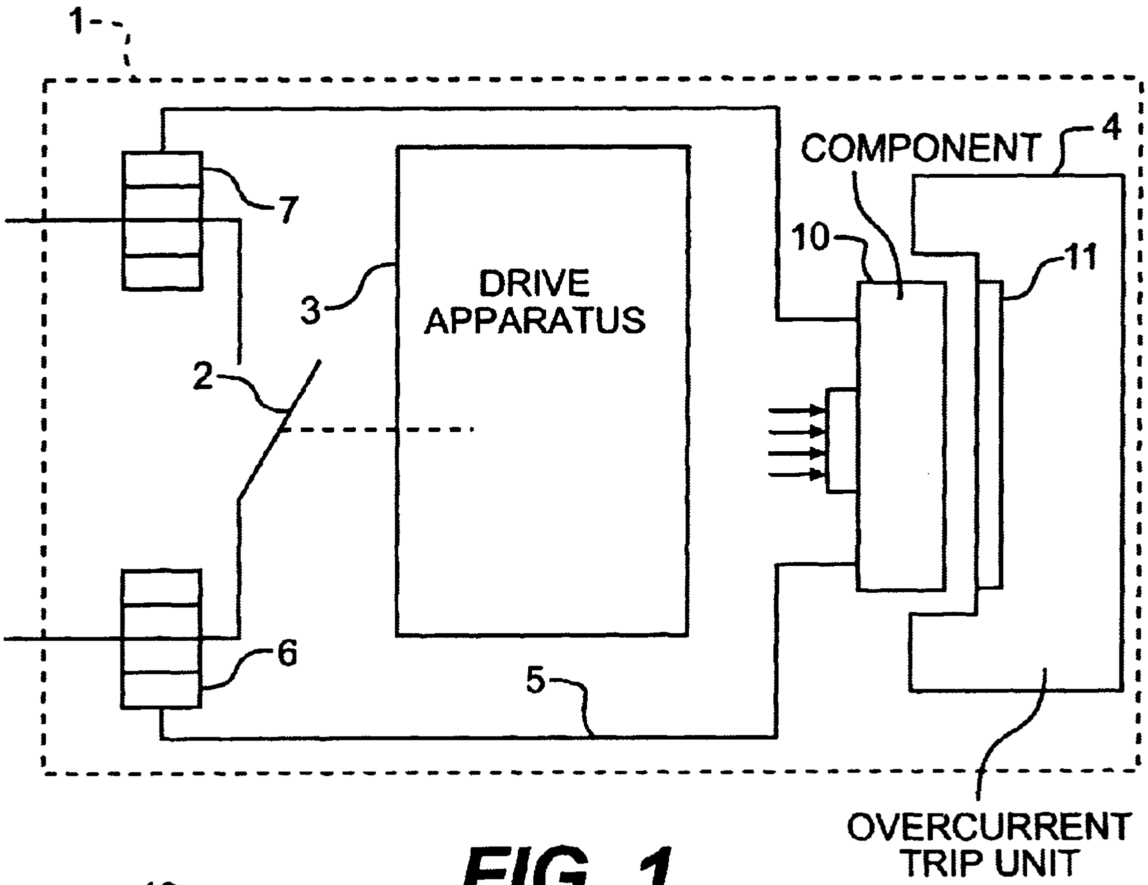
FIG. 1 illustrates a power circuit breaker of an exemplary aspect of the present invention.

FIG. 1 uses a single-pole representation, for example, to illustrate the main components of a low-voltage power circuit breaker. In this case, the dashed outer contour represents the power circuit breaker 1 as an entity. A switching contact 2 and a drive apparatus 3 which interacts with it are located in the interior. The latter includes spring energy stores and latches which are not illustrated, but which can be operated by hand or remote control in order to close and open the switching contact 2. Furthermore, the power circuit breaker 1 has an electronic overcurrent trip unit 4, which forms a protection device in a known manner, in order to open the switching contact 2 where predetermined conditions are satisfied. To this end, the overcurrent trip unit 4 is connected by means of a moving connecting line 5 to a current transformer 6 and receives the auxiliary energy required for a valuation either from the current transformer 56 or from an energy converter 7. The energy converter 7 is provided as an additional item in the illustrated example. One or more current transformers 6 and, possibly, energy converters 7 will be present, depending on the number of poles in the power circuit breaker 1.

Figure 2:
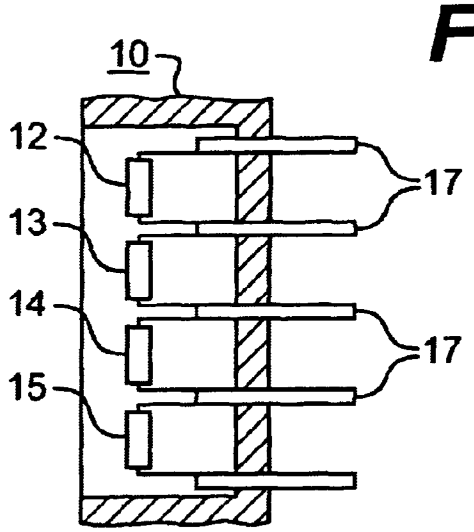
FIG. 2 illustrates details of an exemplary aspect of a component of FIG. 1.
Figure 3:
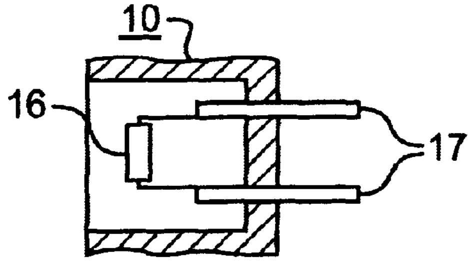
FIG. 3 illustrates details of an exemplary aspect of an alternative component of FIG. 1.

A first component 10 of a two-part plug and socket apparatus is fitted to the end of the flexible line 5, and the associated second component 11 of this plug and socket apparatus is located on the overcurrent trip unit 4. The component 10 at the same time forms an information memory for important characteristic values relating to the power circuit breaker 1. Resistors of an appropriate size are connected between adjacent contact pins of the component 10 for this purpose, as is shown in more detail in FIG. 2. Each of the four resistors 12, 13, 14 and 15 shown in this exemplary case corresponds to one specific parameter, for example the rated current, the switching rating class or the Standard class. In contrast, in the configuration of the component 10 of the plug and socket apparatus as shown in FIG. 3, only a single resistor 16 is used instead of the resistors 12, 13, 14 and 15. This represents a specific combination of characteristic values, as has been found to be sufficient in many cases, and thus represents a particularly simple type of coding. The resistor 16 can be evaluated by means of a simple subroutine in the overcurrent trip unit 4. For example, this can be done in such a way that a read only memory contained in the overcurrent trip unit 4 contains a tabular association of resistance values of the resistor 16 which are read when the current transformer 6 is connected to the overcurrent trip unit 4 and it is activated, and is converted into control signals for programming the microprocessor device contained in the overcurrent trip unit.

For reasons associated with reliable evaluation of the resistances by means of a logic circuit within the electronic overcurrent trip unit 4, it is recommended that 1Ω and 1 MΩ be selected as limit values for the resistance of the resistors 12 to 16. This range of resistors can be broken down, for example, into 16 values, which are identified without errors.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An electrical power circuit breaker, comprising:

an electromechanical assembly including at least one switching contact, a drive apparatus which operates the switching contact, and at least one latching devices for allowing energy stores to close and open the switching contact;

a current sensor for detecting a current flowing via the switching contact;

an electronic overcurrent trip unit for processing a signal from the current sensor and for emitting a signal instructing the at least one latching device to open the switching contact;

a moving connecting line for connecting the current sensor to the overcurrent trip unit; and an information memory for passing characteristic values of the electromechanical assembly in the power circuit breaker to the overcurrent trip unit, wherein the information memory is a part of a first component, which is connected on the connecting line of a two-part plug and socket apparatus, whose second component is part of the overcurrent trip unit.

2. The power circuit breaker as claim in claim 1, wherein the information memory is formed by at least one resistor, connected between contact pins of the first component of the plug and socket apparatus.

3. The power circuit breaker as claimed in claim 2, wherein one resistor is provided for each characteristic value to be coded.

4. The power circuit breaker as claimed in claim 2, wherein one individual resistor is provided, whose resistance represents a predetermined combination of characteristic values.

5. The power circuit breaker of claim 3, wherein one resistor is provided for each of a plurality of characteristic values to be coded, including rated current of the power circuit breaker, physical size of the power circuit breaker, switching a rating class of the electromechanical assembly, and a standard class.

6. The power circuit breaker of claim 3, wherein each resistor has a resistance between approximately 1Ω and approximately 1 MΩ.

7. The power circuit breaker of claim 5, wherein each resistor has a resistance between approximately 1Ω and approximately 1 MΩ.

8. The power circuit breaker of claim 7, wherein defined steps of the characteristic values are allocated to the resistance values.

9. The power circuit breaker of claim 2, wherein one single resistor is provided for a plurality of characteristic values to be coded, a resistance of the resistor representing a predetermined combination of the characteristic values.

10. The power circuit breaker of claim 9, wherein the plurality of characteristic values include rated current of the power circuit breaker, physical size of the power circuit breaker, switching a rating class of the electromechanical assembly, and a standard class.

* * * * *